(12) United States Patent
Danilov et al.

(10) Patent No.: US 10,712,968 B2
(45) Date of Patent: Jul. 14, 2020

(54) MANAGEMENT OF STATE INFORMATION BACKUP FOR AN AUXILIARY STORAGE SERVICE IN A MICROSERVICE ARCHITECTURE

(71) Applicant: EMC IP Holding Company LLC, Hopkinton, MA (US)

(72) Inventors: Mikhail Viktorovich Danilov, Saint Petersburg (RU); Konstantin Sergeevich Buinov, Leningradskaya area (RU); Aleksander Georgievich Rakulenko, Seattle, WA (US); Andrey Vsevolodovich Kurilov, Vsevolozhsk (RU); Kirill Viktorovich Gusakov, Sestroretsk (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/785,519

(22) Filed: Oct. 17, 2017

(65) Prior Publication Data
US 2018/0292993 A1 Oct. 11, 2018

(30) Foreign Application Priority Data
Apr. 11, 2017 (RU) ................................ 2017112297

(51) Int. Cl.
*G06F 3/06* (2006.01)
(52) U.S. Cl.
CPC .............. *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 6,456,407 B1 * | 9/2002 | Tammela | H04J 14/0283 370/222 |
| 2015/0085637 A1 * | 3/2015 | Nahlous | H04L 12/437 370/217 |
| 2016/0299823 A1 * | 10/2016 | Botes | G06F 11/2094 |
| 2017/0228285 A1 * | 8/2017 | Merritt | G06F 11/1076 |
| 2017/0249216 A1 * | 8/2017 | Bellur | G06F 3/06 |
| 2018/0284986 A1 * | 10/2018 | Bhagi | G06F 11/1453 |

* cited by examiner

*Primary Examiner* — Charles Rones
*Assistant Examiner* — Jonah C Krieger
(74) *Attorney, Agent, or Firm* — Ryan, Mason & Lewis, LLP

(57) ABSTRACT

Methods and apparatus are provided for protection of state information for an auxiliary storage service in a microservice architecture. An exemplary method comprises generating a snapshot of state information of an auxiliary storage service on a given storage node in a storage cluster comprised of a plurality of storage nodes; and providing the snapshot to M protector storage nodes within the plurality of storage nodes in the storage cluster, wherein the M protector storage nodes comprises a snapshot manager node and M−1 additional protector storage nodes, and wherein the M protector storage nodes are selected based on a hierarchical ranking of available storage nodes within the storage cluster arranged in a predefined configuration relative to the given storage node. The predefined configuration of the plurality of storage nodes can be, for example, a protection ring comprising a first M−1 online storage nodes that follow the snapshot manager node in the protection ring in a predefined direction.

20 Claims, 4 Drawing Sheets

MANAGEMENT OF STATE INFORMATION BACKUP FOR AN AUXILIARY STORAGE SERVICE IN A MICROSERVICE ARCHITECTURE

FIELD

The field relates generally to storage systems, and more particularly, to techniques for protecting state information in a storage cluster comprised of a plurality of storage nodes.

BACKGROUND

Storage nodes are often arranged in a storage cluster in a flat cluster arrangement where functions are distributed substantially evenly between all storage nodes in the storage cluster. Compliance with the flat cluster principle allows large scale-out clusters to be built, often comprising thousands of storage nodes.

A Microservice Architecture pattern comprising core storage services and auxiliary storage services is often applied in storage clusters. According to a Microservice Architecture pattern, complex software systems are comprised of rather small and highly decoupled processes, referred to as microservices. Each microservice is expected to work independently and to be independently deployable and upgradeable.

There is typically a requirement for stateful auxiliary storage services to store backup snapshots of their states without using the core storage services. A need therefore exists for reliable snapshot backup management techniques for auxiliary storage services that do not use core storage services and optionally adhere to the flat cluster principle.

SUMMARY

In one embodiment, a method comprises generating a snapshot of state information of an auxiliary storage service on a given storage node in a storage cluster comprised of a plurality of storage nodes; and providing the snapshot to a plurality, M, of protector storage nodes within the plurality of storage nodes in the storage cluster, wherein the M protector storage nodes comprises a snapshot manager node and M−1 additional protector storage nodes, and wherein the M protector storage nodes are selected based on a hierarchical ranking of available storage nodes within the storage cluster arranged in a predefined configuration relative to the given storage node.

In some embodiments, the predefined configuration of the plurality of storage nodes comprises a protection ring. The protection ring comprises, for example, a first M−1 online storage nodes that follow the snapshot manager node in the protection ring in a predefined direction. The membership in the protection ring can be updated, for example, (i) when one or more of the M different protector storage nodes becomes unavailable, and/or (ii) when a storage node that is not in the protection ring becomes available and is closer to the snapshot manager node than one or more current protector storage nodes.

In an exemplary embodiment, the disclosed snapshot backup management techniques do not employ resources of one or more core services monitored by the auxiliary storage service, and the functions in the storage cluster are optionally distributed substantially evenly between the plurality of storage nodes in the storage cluster.

Other illustrative embodiments include, without limitation, apparatus, systems, methods and computer program products comprising processor-readable storage media.

DETAILED DESCRIPTION

Figure 1:
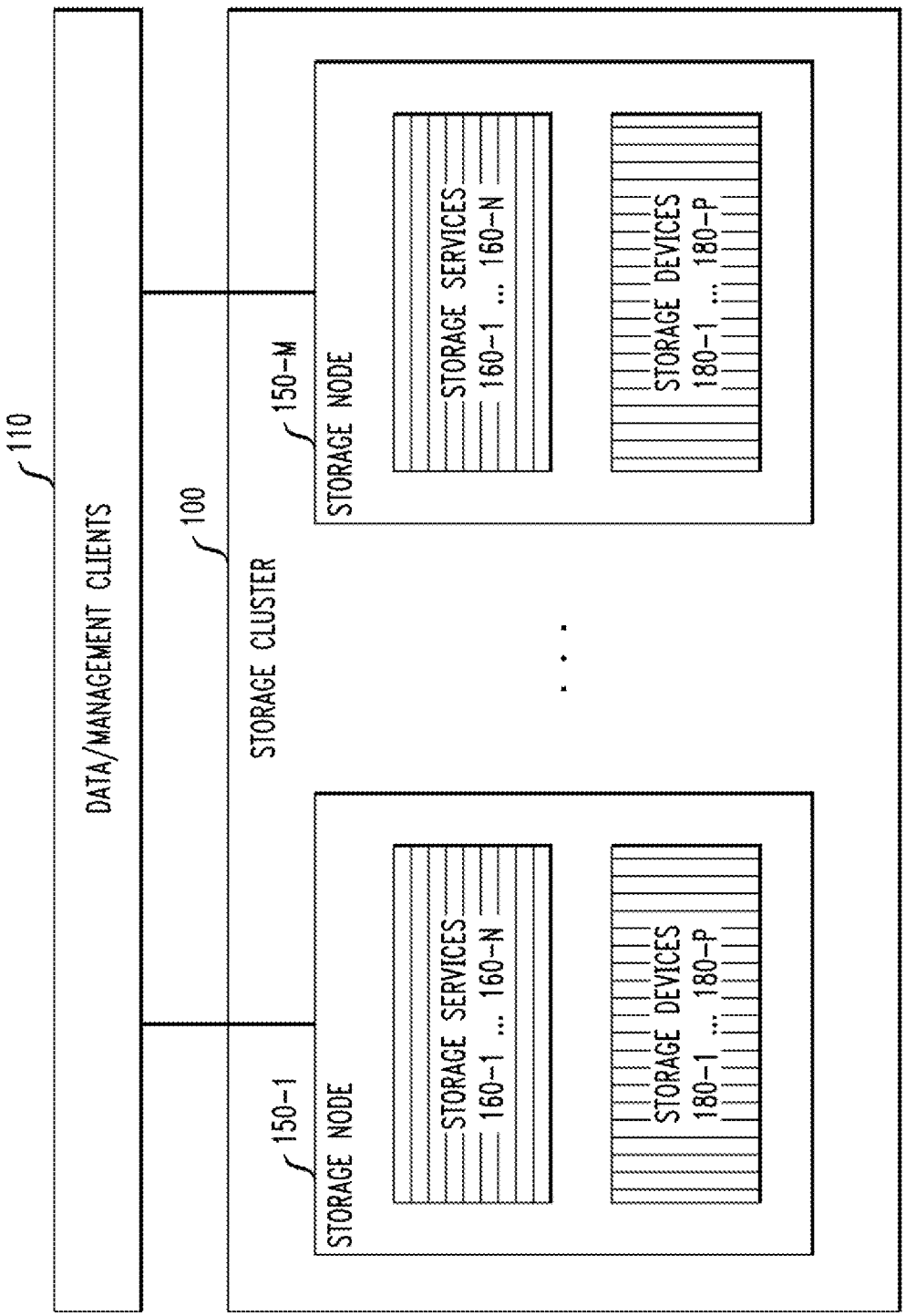
FIG. 1 illustrates an exemplary architecture for a storage cluster comprised of a plurality of storage nodes, according to one embodiment of the present disclosure.

Illustrative embodiments of the present disclosure will be described herein with reference to exemplary storage systems and associated computers, servers, storage devices and other processing devices. It is to be appreciated, however, that embodiments of the disclosure are not restricted to use with the particular illustrative system and device configurations shown. The term "information processing system" as used herein is intended to be broadly construed, so as to encompass, for example, processing systems comprising cloud computing and storage systems, as well as other types of processing systems comprising various combinations of physical and virtual processing resources. In many embodiments, an information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Some illustrative embodiments of the present disclosure provide methods and apparatus for management of state information (e.g., snapshots) backup for an auxiliary storage service in a microservice architecture having core storage services and auxiliary storage services. According to one exemplary embodiment, an auxiliary storage service on a given storage node in a storage cluster comprised of a plurality of storage nodes generates a snapshot of state information of the auxiliary storage service. In one exemplary embodiment, the generated snapshot is provided to M protector storage nodes within the storage cluster. As discussed further below, the set of protector storage nodes comprises a snapshot manager node and M−1 additional protector storage nodes. The protector storage nodes are selected based on a hierarchical ranking of available storage nodes within the storage cluster arranged in a predefined configuration, such as a protection ring, relative to the given storage node.

In at least one embodiment of the present disclosure, the disclosed backup management techniques for auxiliary storage service state information do not use the core storage services. In addition, the exemplary backup management techniques for auxiliary storage service state information optionally comply with the flat cluster principle (e.g., functions in the storage cluster are distributed substantially evenly between the storage nodes).

While one or more exemplary embodiments discussed herein employ protection rings, a number of other predefined storage node configurations can be employed to provide a hierarchical ranking of available storage nodes within the storage cluster, relative to the storage node that generates a given snapshot, as would be apparent to a person of ordinary skill in the art based on the present disclosure. Node availability can be managed, for example, by a Cluster Manager, that joins nodes to one cluster and keeps track of the states of nodes.

In one or more embodiments, storage services are provided for users under a platform-as-a-service (PaaS) model, although it is to be appreciated that numerous other cloud infrastructure arrangements could be used.

The example embodiment of FIG. 1 shows an exemplary architecture for a storage cluster 100 comprised of a plurality of storage nodes 150-1 through 150-M, according to one embodiment of the present disclosure. The exemplary storage cluster 100 is accessed by one or more data and/or management clients 110. As shown in FIG. 1, each storage node 150 is associated with a plurality of storage devices 180-1 through 180-P (e.g., hard disk drives and/or solid state storage devices, such as flash devices). Each storage node 150 runs a number of storage services 160-1 through 160-N. The variables M, N and P are positive integers greater than or equal to one.

The set of storage services 160 typically includes a set of core storage services, which generally implement the business logic of storage, in a known manner. In addition, the set of storage services 160 may also include auxiliary storage services, e.g., services that provide capacity reporting and gather system statistics. There is often a requirement that the auxiliary storage services are independent from the core storage services. In other words, the auxiliary storage services must remain substantially fully functional even when the core storage services are not available.

The exemplary storage cluster 100 may be implemented, for example, using the cluster-based data storage devices commercially available from Dell EMC® of Hopkinton, Mass., such as Elastic Cloud Storage (ECS™) 3.0.

The storage cluster 100 can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage cluster 100 in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The plurality of storage nodes 150-1 through 150-M optionally communicate over a storage network (not shown). The storage network is assumed to comprise a storage area network (SAN) or a portion of a global computer network such as the Internet, although other types of networks can be part of the storage network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand®, Gigabit Ethernet or Fibre Channel. Numerous alternative networking arrangements are possible in a given embodiment, as will be appreciated by those skilled in the art.

Referring again to FIG. 1, the storage cluster 100, or portions thereof, in some embodiments may be implemented as part of cloud infrastructure in the form of a cloud-based system such as an Amazon Web Services™ (AWS) system. Other examples of cloud-based systems that can be used to provide at least portions of the storage cluster 100 include Google Cloud Platform™ (GCP) and Microsoft Azure®.

As indicated above, the storage services 160 in some embodiments are provided in accordance with a PaaS model, although storage services can be provided using other techniques in other embodiments.

The processing platforms in the embodiment of FIG. 1 and other processing platforms referred to herein are assumed to be implemented using one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux® containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and associated storage systems that are configured to communicate over one or more networks. For example, distributed implementations of the storage cluster 100 are possible, in which certain components of the storage cluster 100 are in one data center in a first geographic location while other components of the platform reside in one or more other data centers in one or more other geographic locations that are potentially remote from the first geographic location. Thus, it is possible in some implementations of the storage cluster 100 for some storage nodes 150 to reside in a different data center than other storage nodes 150. Numerous other distributed implementations of the storage cluster 100 are possible.

As noted above, one or more auxiliary storage services may gather system statistics. For example, statistics may be actively used by service personnel to identify root-cause issues with the core storage services. Therefore, the statistics service must be substantially fully functional in one or more embodiments, even when one or more core storage services are unavailable (e.g., for the reason associated with the root-cause issue under analysis).

Further, auxiliary storage services should not use the core storage services in one or more embodiments, because a number of auxiliary storage services monitor, measure and/or analyze the core storage services. Therefore, auxiliary storage services in one or more embodiments should not use the core storage services, for example, so that they do not influence the object core storage services that they are intended to monitor, measure and/or analyze.

As noted above, microservices are often expected to work independently of one another. The requirement for auxiliary storage services to be independent from the core storage services is a problem for stateful services because the auxiliary storage services need to protect their states (e.g., history, context and checkpoints) and the auxiliary storage services cannot rely on the core storage services to protect their states. In addition, the states of the auxiliary storage services must be substantially available from other storage nodes 150 to be compliant with the flat cluster principle.

One example of an auxiliary storage services is a statistics service. The statistics service may take into account the nature of statistics and do most manipulations over statistics at the level of the storage node 150. In particular, this exemplary approach for statistics management assures compliance with the flat cluster principle in one or more embodiments. Key system statistics are normally persisted. A statistics service on each storage node 150 typically periodically (e.g., every minute) creates a snapshot of all statistics values and stores this snapshot locally in some system partition. In addition, snapshots may also be stored based upon an occurrence of a predefined event, such as expiration of a timer. After a restart, the statistics service reads the stored statistics snapshot. This substantially ensures consistent statistics reporting at the node level. However, there is a potential issue with statistics reporting at the cluster level. When a management client samples aggregated value of some statistics, there may be dips of the curve caused, for example, by node restarts and/or offline windows. Such dips may be the source of customer confusion and frustration, so there is a need for a method to make statistics reporting at the cluster level more consistent.

Another potential use case includes recovery of a service state after loss of the respective service. First, no hardware is completely reliable, so state snapshot corruption/loss is possible. In addition, a state snapshot may also be lost as a result of a human intervention. In the case of a statistics service, loss of a snapshot impacts statistics reporting at both the node level and the cluster level.

Thus, there is a need to manage the backup of state information for such auxiliary storage services (e.g., state snapshots). There is a further need for reliable backup management techniques for auxiliary storage service state information that optionally do not use core storage services and/or comply with the flat cluster principle (e.g., there must be no centralized decision making).

State Snapshot Backups

In one or more embodiments, methods and apparatus are provided for reliable management of state backup information (e.g., snapshots) for auxiliary storage services. Auxiliary storage services can optionally use the disclosed techniques to protect their states without using core storage services.

As noted above, in at least one embodiment, a state snapshot is protected using at least M copies of the snapshot stored on M different storage nodes 150 in the storage cluster 100 (where M is less than or equal to N, and where N is the number of storage nodes 150 in the storage cluster 100). For example, M can be equal to three.

One or more embodiments of the present disclosure decouple snapshot ownership from snapshot management. The following exemplary terminology is employed herein:

a) Owner Node (also referred to as the "lord" of the snapshot)—the storage node that the snapshot belongs to. The owner node is the only node that can create a new snapshot (or update an existing snapshot);

b) Manager Node (also referred to as the "keeper" of the snapshot)—the node that manages the snapshot. The manager node is responsible for the snapshot protection and for reporting information about the snapshot; and c) Protector Nodes (also referred to as the "fellowship" of the snapshot)—the group of nodes that protect the snapshot by storing a copy of the protected snapshot.

The above roles are run by one or more copies of the auxiliary storage service that needs its state to be protected. In many cases, the owner of the snapshot may also be the manager of the snapshot. The owner node and the manager node are different when the owner node fails to be the manager node, for some reason. One node may be a manager of two or more snapshots. The manager of the snapshot belongs to the protector nodes of the snapshot. In most cases, with M greater than 2, one node is a protector node for two or more snapshots.

Figure 2:
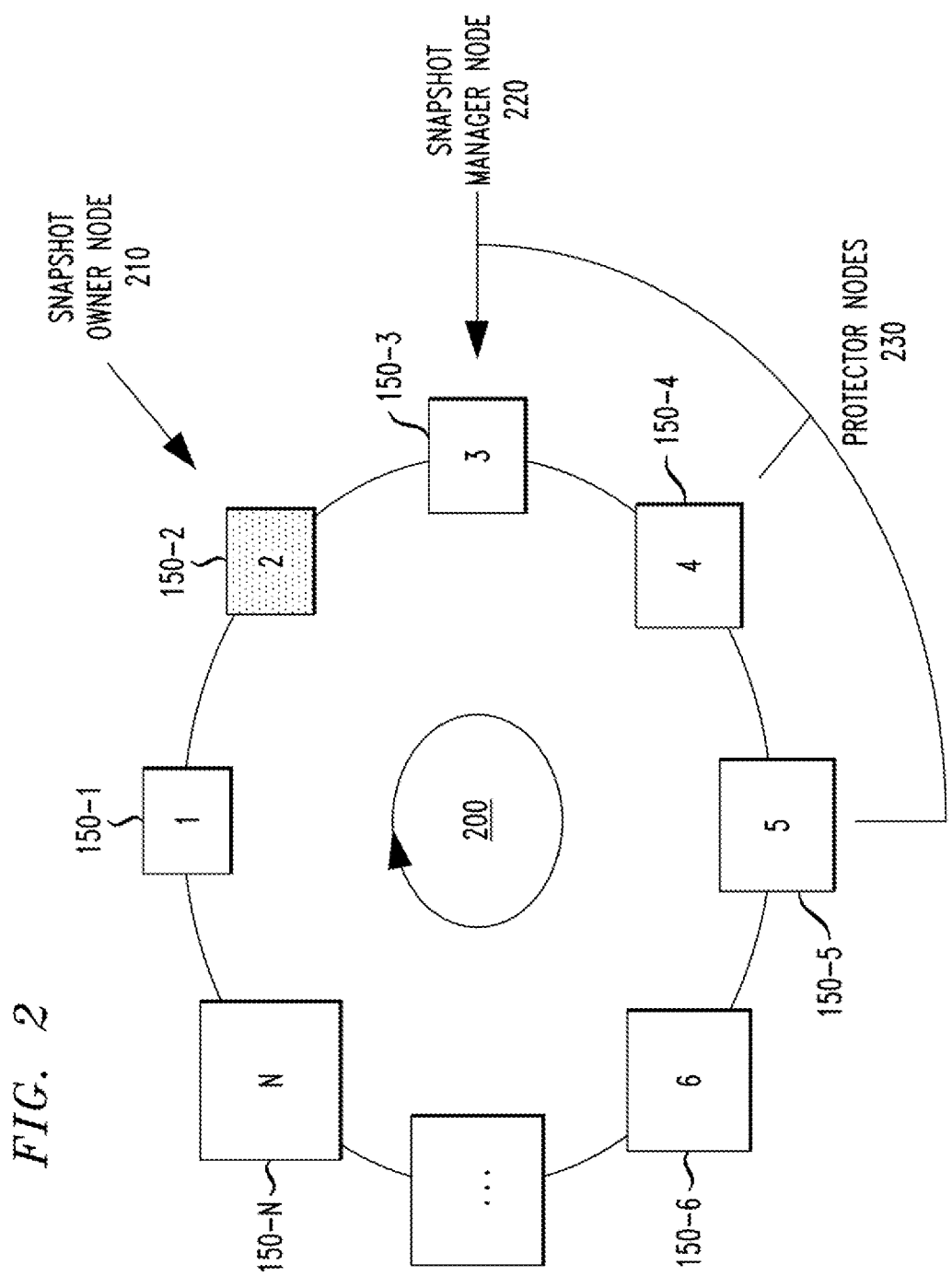
FIG. 2 illustrates an exemplary protection ring comprised of the storage nodes of the cluster of FIG. 1, according to an embodiment of the disclosure.

FIG. 2 illustrates an exemplary protection ring 200 comprised of the N storage nodes 150 of the cluster 100 of FIG. 1, according to one embodiment of the present disclosure. The exemplary protection ring 200 protects a snapshot for a given storage node 150 by storing copies of the snapshot with the protector nodes. As noted above, while the exemplary embodiment shown in FIG. 2 employs a protection ring 200, a number of other predefined storage node configurations can be employed to provide a hierarchical ranking of available storage nodes within the storage cluster, relative to the storage node that generates a given snapshot, as would be apparent to a person of ordinary skill in the art.

In one exemplary embodiment, there is one snapshot per storage node 150 and each snapshot is owned by a snapshot owner node 210 and is managed by a snapshot manager node 220. In some implementations, each service has one instance at each cluster node. When there are N auxiliary storage services that must protect their states, then there will be N snapshots per node. Theoretically, one storage service may have M instances at each cluster node. Then, there are N×M snapshots per cluster node.

As noted above, the snapshot owner node 210 and the snapshot manager node 220 may be the same node. In one or more embodiments, the snapshot manager node 220 maintains the protection ring 200 of cluster nodes 150-1 through 150-N based on a list of the nodes 150 ordered by a node identifier (node id), where the last node 150-N references the first node 150-1. The exemplary protection ring 200 is used to find the storage nodes 150 to make up the protector nodes 230 of the snapshot. To do so, the snapshot manager node 220 selects the first M−1 online nodes 150 that follow the snapshot manager node 220 in the protection ring 200 (e.g., in a clockwise direction). The snapshot manager node 220 may revise the set of protector nodes 230 when some protector nodes 230 become unavailable or another node, that is closer to the snapshot manager 220 than one or more current protector nodes 230, becomes available again.

The exemplary protection ring 200 of nodes 150 in FIG. 2 is maintained by the snapshot manager node 220, e.g., node 150-3 in FIG. 2. The snapshot owner node 210, e.g., node 150-2 in FIG. 2, was the former snapshot manager node 220. The snapshot owner node 210 has protected the snapshot using node 150-3. Thus, node 150-3 has become the new snapshot manager node 220 after the snapshot owner node 210 went offline (for example). As a new snapshot manager node 220, node 150-3 gathered a new set of protector nodes 230 of the snapshot. The set of protector nodes 230 comprises node 150-3 and the two (3−1=2) online nodes that follow the snapshot manager 220 in the exemplary protection ring 200, such as nodes 150-4 and 150-5 in FIG. 2. In this manner, snapshot availability is ensured.

In one or more embodiments, all of the nodes 150 that have running instances of the service with state to protect in a given storage cluster 100 are included in the protection ring 100.

Figure 3:
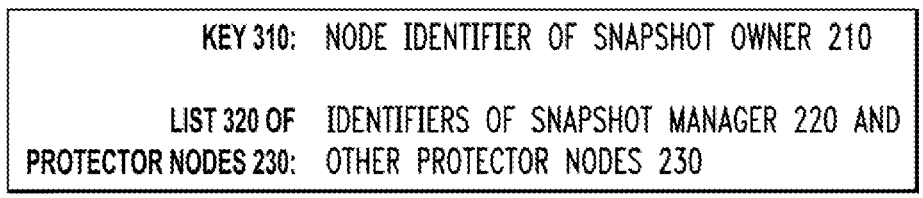
FIG. 3 illustrates an exemplary state snapshot record, according to an illustrative embodiment of the disclosure.

FIG. 3 illustrates an exemplary state snapshot record 300, according to one embodiment of the present disclosure. In one or more embodiments, the exemplary state snapshot record 300 may be stored in a cluster shared memory. The cluster shared memory is managed by a Storage Service 160. The cluster shared memory may be persisted using Storage Devices 180 or some "system partition," e.g., some node local HDD (hard disk drive) that is not used to store user data.

As shown in FIG. 3, the exemplary state snapshot record 300 manages the state of the corresponding cluster node 150 and comprises a key 310 and a list 320 of the nodes in the set of protector nodes 230. In one or more embodiments, the key 310 is an identifier of the particular snapshot, which can be an identifier of the snapshot owner node 210. The list 320 of the nodes in the set of protector nodes 230 can comprise identifiers of the nodes in the set of protector nodes 230 that keep copies of the snapshot. In at least one embodiment, the first node in the set of protector nodes 230 is the snapshot manager node 220.

Auxiliary storage services on each storage node 150 periodically update their local view of the exemplary state snapshot record 300. After each update, for example, to the exemplary state snapshot record 300, the storage node 150 checks the list of roles that must be run by the respective node 150. In a further variation, each storage node 150 can periodically assess the roles that must be run by the respective node 150.

Figure 4:
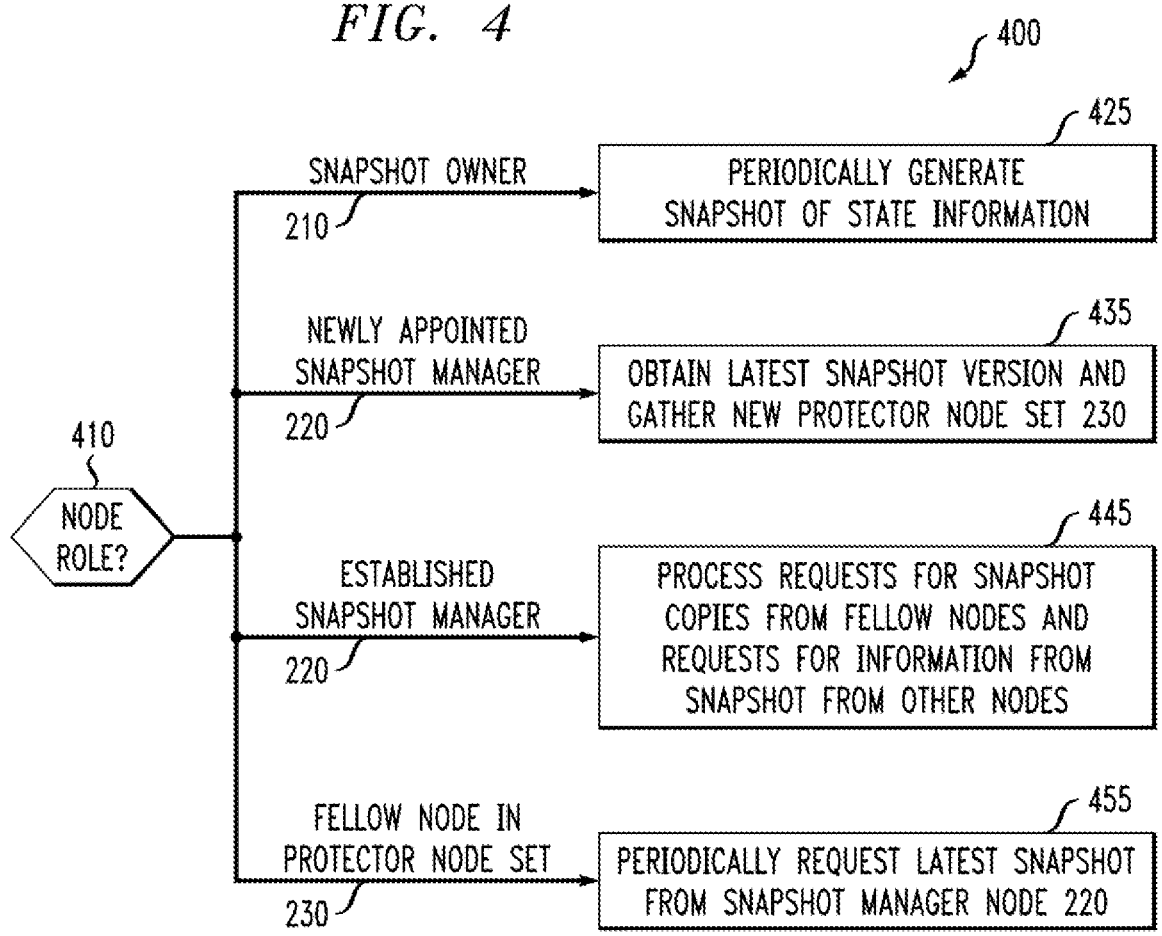
FIG. 4 is a flow chart illustrating an exemplary implementation of a node state management process, according to an embodiment of the disclosure.

FIG. 4 is a flow chart illustrating an exemplary implementation of a node state management process 400, according to one embodiment of the present disclosure. As shown in FIG. 4, a test is performed during step 410 to determine the role of a given storage node 150. If it is determined during step 410 that a given storage node 150 is a snapshot owner 210, then the given storage node 150 periodically generates a snapshot of the state information during step 425.

If it is determined during step 410 that a given storage node 150 is a newly appointed snapshot manager 220 (for example, since the last time the exemplary node state management process 400 was executed for a given storage node 150), then the newly appointed snapshot manager 220 obtains the latest snapshot version and gathers a new protector node set 230 during step 435. For example, in the embodiment of FIG. 2, as a new snapshot manager node 220, storage node 150-3 gathered a new set of protector nodes 230 of the snapshot. The set of protector nodes 230 comprises storage node 150-3 and the two (3−1=2) online storage nodes that follow the snapshot manager 220 (150-3) in the exemplary protection ring 200, such as storage nodes 150-4 and 150-5 in FIG. 2.

If, however, it is determined during step 410 that a given storage node 150 is an established snapshot manager 220, then as the snapshot manager node 220, for example, the storage node works as a server to process two kinds of requests during step 445:

1. Requests for a copy of the snapshot stored by the snapshot manager node 220 from fellow nodes in the set of protector nodes 230; and 2. Requests for information from the snapshot stored by the snapshot manager node 220 from any storage node 150 in the cluster 100.

If, however, it is determined during step 410 that a given storage node 150 is a fellow storage node 150 in the set of protector nodes 230 (and not the snapshot manager node 220), then the fellow storage node 150 is responsible for periodically requesting a latest snapshot from the snapshot manager node 220, during step 455. For example, the fellow storage node 150 periodically (e.g., every five minutes) requests the latest snapshot from the snapshot manager node 220. Therefore, the fellow storage nodes 150 may keep a potentially outdated version of the snapshot for a period of time. There is a tradeoff between the accuracy of reporting and the workload that the auxiliary storage services produce. In order to reduce the workload produced, the fellow storage nodes 150 may request only updates to a snapshot, rather than a complete copy of the snapshot.

A storage node 150 may process the exemplary state snapshot record 300 (FIG. 3) to keep track of the snapshots that the respective node 150 relates to. For example, consider a node A that sees (in the exemplary state snapshot record 300) that it is a fellow node of node B. Then, node A reads a snapshot from node B to protect it. After a while, node A may see that it is no longer a fellow node of node B. Then, node A is free to delete the snapshot from node B.

If the storage node 150 detects that it is no longer a part of the set of protector nodes 230 of a given snapshot, the storage node 150 may delete its local copy of the snapshot.

In one or more embodiments, the snapshot manager node 220 (e.g., the "keeper" of the snapshot) is selected by looping through the exemplary protection ring 200 of storage nodes 150, starting with the snapshot owner node 210 (e.g., the "lord" of the snapshot) and selecting the first node (e.g., based on a node identifier rank) that meets the following exemplary conditions: (i) the node is online; and (ii) the node contains the latest available version of the snapshot.

If the snapshot manager node 220 of a given snapshot, in one or more embodiments, is not the snapshot owner node 210, then the storage nodes 150 in the following range are the candidates for the role of snapshot manager 220:

[snapshot owner node 210, snapshot manager node 220).

Here, the snapshot owner 210 has the highest priority and the storage node that precedes the snapshot manager 220 in the ring 200 has the lowest priority among all the candidates. In order to become the snapshot manager 220, in one or more embodiments, a candidate storage node must:

a) Obtain the latest version of the snapshot available from the current snapshot manager 220; and b) Make itself the snapshot manager 220 by updating the exemplary state snapshot record 300 (FIG. 3) in the shared cluster memory. In one or more embodiments, a compare-and-swap technique can be used to detect conflicting updates.

When the snapshot manager 220 changes, the new snapshot manager 220 finds a new set of M−1 nodes to form the set of protector nodes 230, as discussed above in conjunction with FIG. 4.

In the event that a snapshot corruption or loss is detected, the snapshot owner 210 recovers the state, in a known manner. State recovery happens, for example, after a node/service restart because while the service is running the node has the up-to-date state stored in its volatile memory.

It is to be appreciated that these and other features of illustrative embodiments are presented by way of example only, and should not be construed as limiting in any way.

Accordingly, different numbers, types and arrangements of system components such as storage nodes 150, storage services 160, and storage devices 180 can be used in other embodiments.

It should be understood that the particular sets of storage nodes 150 and other components implemented in the storage cluster 100 as illustrated in FIG. 1 are presented by way of example only. In other embodiments, only subsets of these components, or additional or alternative sets of components, may be used, and such components may exhibit alternative functionality and configurations.

The particular processing operations and other system functionality described in conjunction with the flow diagram of FIG. 4 are presented by way of illustrative example only, and should not be construed as limiting the scope of the disclosure in any way. Alternative embodiments can use other types of processing operations involving storage services, snapshot management and protection ring role assignment. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different snapshot management instances within a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be understood that the particular storage cluster arrangements illustrated in FIGS. 1 and 2 are presented by way of illustrative example only, and should not be construed as limiting in any way. Numerous alternative configurations of system and device elements and associated processing operations can be used in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements.

For example, one or more embodiments provide significantly improved reporting at the cluster level when some nodes are unavailable by directing all information read requests to the snapshot manager 220. When a management client requests information from some auxiliary storage service, the request is handled, for example, by the service copy on the node that the client is connected to. The service does not send read requests to all the other nodes. Instead, the service sends read requests to all the nodes that are snapshot managers 220 of at least one service state snapshot. The service snapshot map 300 (FIG. 3) can be used to compile the list of such nodes, as would be apparent to a person of ordinary skill in the art based on the present disclosure. A service copy on a remote storage node 150 may reply several times, one time per snapshot kept. Therefore, the storage node 150 that handles the request from the client receives information for all the cluster nodes even when some storage nodes 150 are unavailable.

In some embodiments of the present disclosure, the disclosed backup management techniques for auxiliary storage service state information do not use the core storage services. In this manner, one or more auxiliary storage services can monitor, measure and/or analyze the core storage services without influencing the object core storage services that they are intended to monitor, measure and/or analyze.

Further, in one or more embodiments, the exemplary backup management techniques for auxiliary storage service state information comply with the flat cluster principle (e.g., functions in the storage cluster are distributed substantially evenly between the storage nodes).

It is to be appreciated that the particular advantages described above and elsewhere herein are associated with particular illustrative embodiments and need not be present in other embodiments. Also, the particular types of storage cluster and information processing system features and functionality as illustrated in the drawings and described above are exemplary only, and numerous other arrangements may be used in other embodiments.

As mentioned previously, at least portions of the storage cluster 100 of FIG. 1 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute services 106, or portions thereof, are illustratively implemented for use by tenants of such a multi-tenant environment.

As mentioned previously, cloud infrastructure as disclosed herein can include cloud-based systems such as AWS™, GCP™ and Microsoft Azure®. Virtual machines provided in such systems can be used to implement at least portions of one or more of a storage services platform and a state information management system in illustrative embodiments. The cloud-based systems can include object stores such as Amazon™ S3, GCP™ Cloud Storage, and Microsoft Azure® Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
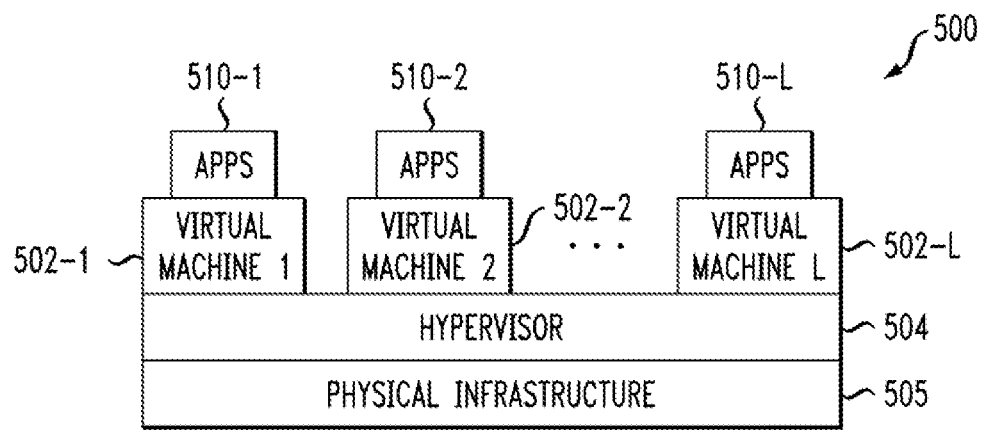
FIGS. 5 and 6 show examples of processing platforms that may be utilized to implement at least a portion of a storage system in illustrative embodiments of the present disclosure.
Figure 6:
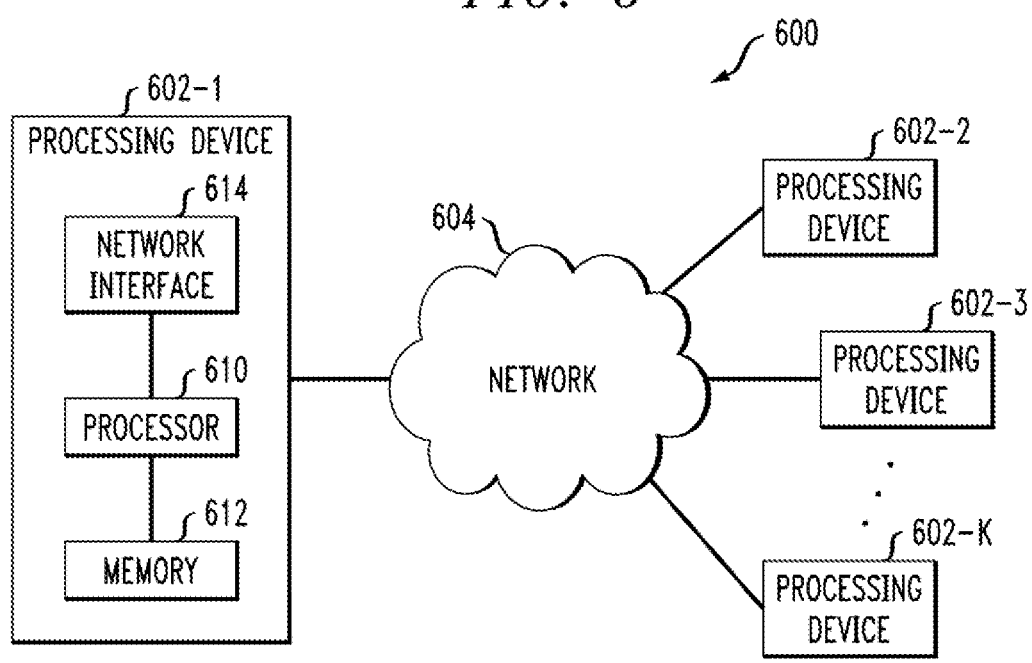

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and storage cluster 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the storage cluster 100. Such components can communicate with other elements of the storage cluster 100 over any type of network or other communication media.

As indicated previously, components of a storage cluster as disclosed herein can be implemented at least in part in the form of one or more software programs stored in memory and executed by a processor of a processing device. For example, at least portions of the functionality of snapshot owner 210, snapshot manager 220 and set of protector nodes 230 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of storage clusters, information processing systems and storage services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
generating a snapshot of state information of an auxiliary storage service on a given storage node in a storage cluster comprised of a plurality of storage nodes, wherein the given storage node implements a set of storage services in a microservice architecture, the set of storage services comprising at least said auxiliary storage service and one or more core storage services monitored by said auxiliary storage service;
selecting a plurality, M, of protector storage nodes within said plurality of storage nodes in the storage cluster, wherein said M protector storage nodes comprises a snapshot manager node corresponding to said given storage node and M−1 additional protector storage nodes, and wherein said M protector storage nodes are selected based on a hierarchical ranking of available storage nodes within said storage cluster arranged in a predefined configuration relative to said given storage node;
providing said snapshot to each of said M−1 additional protector storage nodes; and
in response to said given storage node becoming unavailable, selecting a new snapshot manager node from among said M−1 protector nodes to manage said snapshot, wherein said method does not employ resources of said one or more core storage services monitored by said auxiliary storage service such that the auxiliary storage service remains functional in case the one or more core storage services are unavailable.

2. The method of claim 1, wherein said predefined configuration of said plurality of storage nodes comprises a protection ring.

3. The method of claim 2, wherein said protection ring comprises a first M−1 online storage nodes that follow the snapshot manager node in the protection ring in a predefined direction.

4. The method of claim 2, wherein said protection ring is updated in response to one or more of said M protector storage nodes becoming unavailable.

5. The method of claim 1, wherein said state information comprises statistics values.

6. The method of claim 1, wherein functions in the storage cluster are distributed substantially evenly between said plurality of storage nodes in the storage cluster.

7. An apparatus, comprising:
a memory; and
at least one processing device, coupled to the memory, operative to implement the following steps:
generating a snapshot of state information of an auxiliary storage service on a given storage node in a storage cluster comprised of a plurality of storage nodes, wherein the given storage node implements a set of storage services in a microservice architecture, the set of storage services comprising at least said auxiliary storage service and one or more core storage services monitored by said auxiliary storage service;
selecting a plurality, M, of protector storage nodes within said plurality of storage nodes in the storage cluster, wherein said M protector storage nodes comprises a snapshot manager node corresponding to said given storage node and M−1 additional protector storage nodes, and wherein said M protector storage nodes are selected based on a hierarchical ranking of available storage nodes within said storage cluster arranged in a predefined configuration relative to said given storage node;
providing said snapshot to each of said M−1 additional protector storage nodes; and
in response to said given storage node becoming unavailable, selecting a new snapshot manager node from among said M−1 protector nodes to manage said snapshot, wherein said steps do not employ resources of said one or more core storage services monitored by said auxiliary storage service such that the auxiliary storage service remains functional in case the one or more core storage services are unavailable.

8. The apparatus of claim 7, wherein said predefined configuration of said plurality of storage nodes comprises a protection ring.

9. The apparatus of claim 8, wherein said protection ring comprises a first M−1 online storage nodes that follow the snapshot manager node in the protection ring in a predefined direction.

10. The apparatus of claim 8, wherein said protection ring is updated responsive to one or more of:
(i) one or more of said M protector storage nodes becomes unavailable, and
(ii) a storage node that is not in said protection ring becomes available and is closer to the snapshot manager node than one or more current protector storage nodes.

11. The apparatus of claim 7, wherein said state information comprises statistics values.

12. The apparatus of claim 9, wherein functions in the storage cluster are distributed substantially evenly between said plurality of storage nodes in the storage cluster.

13. A computer program product comprising a non-transitory processor-readable storage medium having stored therein program code of one or more software programs, wherein the program code when executed by at least one processing platform causes said at least one processing platform to implement the following steps:
generating a snapshot of state information of an auxiliary storage service on a given storage node in a storage cluster comprised of a plurality of storage nodes, wherein the given storage node implements a set of storage services in a microservice architecture, the set of storage services comprising at least said auxiliary storage service and one or more core storage services monitored by said auxiliary storage service;

selecting a plurality, M, of protector storage nodes within said plurality of storage nodes in the storage cluster, wherein said M protector storage nodes comprises a snapshot manager node corresponding to said given storage node and M−1 additional protector storage nodes, and wherein said M protector storage nodes are selected based on a hierarchical ranking of available storage nodes within said storage cluster arranged in a predefined configuration relative to said given storage node;

providing said snapshot to each of said M−1 additional protector storage nodes; and in response to said given storage node becoming unavailable, selecting a new snapshot manager node from among said M−1 protector nodes to manage said snapshot, wherein said steps do not employ resources of said one or more core storage services monitored by said auxiliary storage service such that the storage service remains functional in case the one or more core storage services are unavailable.

14. The computer program product of claim 13, wherein said predefined configuration of said plurality of storage nodes comprises a protection ring comprising a first M−1 online storage nodes that follow the snapshot manager node in the protection ring in a predefined direction.

15. The computer program product of claim 14, wherein said protection ring is updated responsive to one or more of:
   (i) one or more of said M protector storage nodes becomes unavailable, and
   (ii) a storage node that is not in said protection ring becomes available and is closer to the snapshot manager node than one or more current protector storage nodes.

16. The computer program product of claim 13, wherein said state information comprises statistics values.

17. The computer program product of claim 13, wherein said snapshot manager node is said given storage node.

18. The method of claim 2, wherein said protection ring is updated in response to a storage node that is not in said protection ring becoming available and is closer to the snapshot manager node than one or more current protector storage nodes.

19. The method of claim 2, wherein said new snapshot manager node is selected based is the storage node in said protection ring that is closest to said given storage node that is available.

20. The apparatus of claim 7, wherein said new snapshot manager node is selected based is the storage node in said protection ring that is closest to said given storage node that is available.

* * * * *